Patented Feb. 14, 1950

2,497,315

UNITED STATES PATENT OFFICE 2,497,315

OXYGENATED ORGANIC POLYMERS

Donald J. Loder and William F. Gresham, Wilmington, Del., assignors to E. I. du Pont de Nemours & Company, Wilmington, Del., a corporation of Delaware No Drawing. Original application May 6, 1941, Serial No. 392,128. Divided and this application December 30, 1944, Serial No. 570,772

7 Claims. (Cl. 260—2)

This invention relates to a process for the preparation of oxygenated organic polymeric compounds, and more particularly to their preparation from 1,3-dioxolane and polyhydric compounds and to the resulting polymers. This application is a division of my copending application 392,128, filed May 6, 1941, and now abandoned.

The copending application of W. F. Gresham, S. N. 392,124, filed May 6, 1941, and now Patent Number 2,394,910, issued February 12, 1946, discloses that 1,3-dioxolane, a 5-membered ring, can be treated to give polymers ranging in properties from mobile liquids to cold-drawable crystalline-like solids. That invention is entirely contrary to the teachings of the art which insists that 5-membered rings are stable and consequently unpolymerizable. As a corollary to the prior art teaching, it would be logical to assume that a stabile 5-membered ring such as 1,3-dioxolane would not readily break and enter into reactions to form polymeric compounds.

In contradistinction to the teachings of the art, the present invention provides new reaction products obtained from 1,3-dioxolane and its substitution products with other organic compounds. Another object of the invention is to provide new compositions of matter from 1,3-dioxolane, or its substitution products, and polyhydric compounds. Yet another object is to provide a process for the interaction of 1,3-dioxolane and its substitution products with polyhydric alcohols, their ethers, esters, and other derivatives, said derivatives containing at least one free hydroxyl group. Another object of the invention is to provide reaction conditions and catalysts for such reactions whereby valuable products are obtainable. Other objects and advantages of the invention will hereinafter appear.

Valuable products are obtained in accord with the invention by reacting 1,3-dioxolane with polyhydric compounds, such, for example, as the:

(1) Polyhydric alcohols including especially the glycols and glycerols.

(2) Derivatives of the polyhydric alcohols which contain at least one free hydroxyl group.

(3) Carbohydrates such as the monosaccharides, the disaccharides, and the polysaccharides as defined by Hackh, "Chemical Dictionary," 1937, pages 185–6.

The products of the invention are of relatively high molecular weight and will hereinafter be referred to as polymers, which term will include all products containing at least two 1,3-dioxolane residues and at least one alcohol residue. For example, the polymers resulting from the reaction of 1,3-dioxolane with ethylene glycol will contain at least two 1,3-dioxolane residues, each having the formula —CH$_2$OCH$_2$CH$_2$O— and at least one glycol residue which may be either —CH$_2$CH$_2$O— or HOCH$_2$CH$_2$O—, the latter occurring on the end, the former within the molecule. The polymers of the invention are believed to have a linear form and there is good theoretical foundation for this assumption; the formulas given below, therefore, describe the products by way of illustration and not by way of limitation.

The invention may be illustrated by the reaction of 1,3-dioxolane and ethylene glycol in accord with the equations:

(1) 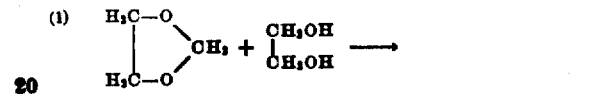

HOCH$_2$CH$_2$OCH$_2$OCH$_2$CH$_2$OH (2) 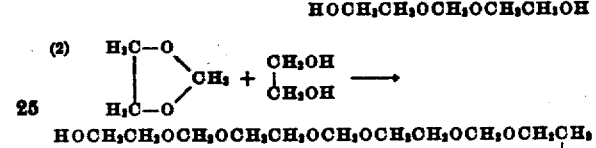

HOCH$_2$CH$_2$OCH$_2$OCH$_2$CH$_2$OCH$_2$OCH$_2$CH$_2$OCH$_2$CH$_2$OH

In (1) 1,3-dioxolane reacts with ethylene glycol to form di(beta-hydroxyethyl)formal, while in reaction (2) the formation of di(beta-hydroxyethoxymethoxyethyl)formal is illustrated by the reaction of three moles of 1,3-dioxolane with one mole of ethylene glycol, both compounds being liquid polymers.

The alcohols, their ethers and esters, may be reacted in accord with the procedural details more fully particularized hereinafter, with 1,3-dioxolane has the chemical formula with numbering as shown:

and may be obtained by reacting formaldehyde with ethylene glycol. Products with substituents in the 2 position can be readily obtained by reaction of ketones or other aldehydes either aliphatic or aromatic with ethylene glycol. Thus, by way of example, many compounds are obtained which may be employed in accord with the invention, such as 2-methyl-1,3-dioxolane, 2-ethyl-1,3-dioxolane, 2,2-dimethyl-1, 3-dioxolane, 2,2-diethyl-1,3-dioxolane, 2-phenyl-1,3-dioxolane, 2,2 - methylphenyl - 1,3 - dioxolane, and higher dioxolanes substituted in like manner which may, for example, be obtained from ethylene glycol and acetaldehyde, propanal, acetone, diethyl ketone, benzaldehyde, methyl phenyl ketone, and higher substituted aldehydes respectively. The invention likewise contemplates the use of dioxolanes substituted in the 4 and/or 5 positions. These dioxolanes are obtained by the interaction of substituted 1,2-glycols with aldehydes, for example, 1,2-propylene glycol+formaldehyde will give 4-methyl-1,3-dioxolane and similarly the following dioxolanes can be readily prepared from formaldehyde and the corresponding glycols: 4-ethyl-1,3-dioxolane, 4-propyl-1,3-dioxolane, 4,5-dimethyl-1,3-dioxolane, and the like. The polymers of 1,3-dioxolane as described in the copending application of W. F. Gresham, S. N. 392,124, filed May 6, 1941, can likewise be reacted with the hydroxyl-containing compounds to give higher molecular weight products.

The above dioxolanes may be reacted with hydroxyl-containing compounds and more particularly by way of example the monohydric alcohols such as methanol, ethanol, n- and iso-propanol, n- and iso-butanol, and the higher straight and branch chained monohydric alcohols as well as mixtures of alcohols, such, for example, as those obtained by the catalytic hydrogenation of carbon oxides under elevated temperatures and pressures and similar mixtures of alcohols, such as are obtained by the catalytic hydrogenation of oils or fats (consisting mainly of alcohols of the empirical formula $C_8H_{17}OH$ to $C_{18}H_{37}OH$, in which alcohols about 50% of dodecyl alcohol is generally present). There likewise may be used in accord with the invention the higher straight and branch chained alcohols, such, for example, as hexyl, heptyl, octyl, nonyl, decyl, dodecyl, tetradecyl, cetyl, carnaubyl, ceryl, melissyl, tarchonyl alcohols, and the like. Polyhydric alcohols may likewise be employed, such, for example, as ethylene glycol and the vicinal glycols generally; 1,2-propylene glycol, 1,2-butylene glycol, 2,3-butylene glycol, and the higher polyhydric alcohols, such as, for example, trimethylene glycol, diethylene glycol, triethylene glycol, tetraethylene glycol, hexamethylene glycol, dipropylene glycol, and the higher polyhydric alcohols, such as glycerol, erythritol, pentitols, hexitols, hepitols, arabitol, mannitol, sorbitol, dulcitol, and so forth. Alkyl ethers of the above designated polyhydric alcohols are likewise included, such, for example, as the monoalkyl ethers of ethylene glycol, diethylene glycol, propylene glycol, and more specifically the monomethyl ether of ethylene glycol, monoethyl ether of ethylene glycol, monomethyl ether of glycerol; the monoesters of the above polyhydric alcohols such as, for example, ethylene glycol, propylene glycol, and glycerol mono acetate, propionate, stearate, oleate, etc., which contain a free hydroxyl group and in fact any substituted polyhydric alcohol may be used provided there is present at least one free hydroxyl group.

In addition to the more or less simple monohydric and polyhydric alcohols above referred to as suitable for use in the reaction, there may likewise be included compounds generally which contain a free hydroxyl group and as examples of such compounds the invention contemplates the use of the carbohydrates generally and more specifically, glycerose, erythose, arabinose, dextrose, mannose, sorbose, lactose, maltose, sucrose, raffinose, dextrines, starches, celluloses, hemicelluloses, gums, glucosides and tannins. Included in this group are the cellulose derivatives, as, for example, methyl, ethyl, and propyl cellulose, partially etherified, and cellulose acetate, acetopropionate, glycolate, etc., partially esterified.

Valuable polymers are obtainable from the reaction of large amounts of 1,3-dioxolane with small amounts of the hydroxyl-containing compound. The greater the amount of dioxolane present the greater becomes the viscosity of the polymers until solids are produced, while contrarywise the greater the ratio of the hydroxyl-containing compound the less viscous will be the resulting polymer. There appears to be no limiting factor restricting the proportions of the reactants.

The reaction between the dioxolane and hydroxyl-containing compound is effected at temperatures ranging between −80 and +300° C. and preferably between 0 and 150° C. Atmospheric, sub- or superatmospheric pressures may be used, and if the last, pressures may range between 1 and 1000 atmospheres or higher. Normally excellent results are obtained at or about atmospheric pressure. If desired, the temperature of the reaction, especially when polymerization is carried out at the boiling point of the reaction mixture, may be controlled by varying the pressure on the boiling reactants.

It has been found advantageous to effect the reaction in the presence of an acidic type catalyst such, for example, as sulfuric acid, phosphoric acid; the halogen acids, such as hydrochloric acid, hydrofluoric acid (alone or with $BF_3$); boron fluoride (including its complexes with water, acids, esters, alcohols, and the like), paratoluene sulfonic acid, camphor sulfonic acid, and other acid catalysts of this general nature. Friedel-Crafts type catalysts other than $BF_3$ may be used, such as $AlCl_3$, $AlBr_3$, $FeCl_3$, and so forth, as well as inorganic acids generally and their acid salts such as sodium acid sulfate, sodium acid phosphate, and so forth.

The catalyst may be supported or not or inert supports such as charcoal, silica gel (which alone is a catalyst for the reaction), kieselguhr, and so forth. Concentrations of $BF_3$, $H_2SO_4$ and similarly strong catalysts may be extremely low; less than 0.1%, and amounts down to as low as 0.001% of the strong acid catalyst have been found sufficient to give polymers although high concentrations of the catalyst even equal to or greater than the weight of the dioxolane are likewise satisfactory.

The reaction is preferably continued approximately to equilibrium in order to obtain the above defined polymeric oxygenated organic compounds. The reaction may then be stopped by destroying the catalyst. This may be done by removing it (in the case of silica gel, kieselguhr, and the like) or by treating the reaction mixture with an inorganic base, such as ammonia, alkali metal, and alkaline earth metal hydroxides, carbonates, alkoxides, and so forth or an organic base, such as pyridine, dimethylamine, and the like. These bases are added in sufficient amounts to neutralize the catalyst when acid catalysts are used, and the unconverted reactants may be removed by distillation under reduced pressures. As soon as the catalyst has been neutralized, the reaction ceases. The neutralized catalyst may be filtered off and the polymerized product which remains treated for the recovery of the polymers.

In the reaction of the dioxolanes and hydroxyl-containing compounds and more especially 1,3-dioxolane and the glycols to give polymers, there usually will be found in the reaction mixture along with the polymer, unreacted dioxolane and glycol, together with by-products and polymers which it is not desired to produce. It is possible to inhibit the formation of the undesired products by carrying out the process in an intermittent or continuous manner whereby the desired polymer is withdrawn from the reaction zone and the undesirable products, after being separated therefrom, are returned to the reaction zone. By this means it is possible to obtain high yields of the desired polymer.

In addition to being instrumental in stopping the reaction at the desired point, the neutralization of the catalyst tends to stabilize the polymers. It follows, therefore, that for high temperature uses, no acid should be present in the polymers. They should preferably be neutral or on the alkaline side.

Examples will now be given illustrating embodiments of the invention, but it will be understood that it will not be limited by the details thereof. Parts are by weight unless otherwise indicated.

*Example 1.*—A reaction mixture was prepared by mixing 148 parts of 1,3-dioxolane, 496 parts of glycol and 6 parts of sulfuric acid. This was heated on a steam bath under a reflux condenser for 5 hours. In the initial stages of the reaction dioxolane refluxed. After approximately 1 hour, boiling ceased and the reaction mixture became somewhat viscous. The catalyst was then neutralized, to blue litmus, with a methanol solution of sodium methoxide and the reaction product was fractionally distilled under reduced pressure. The following materials were obtained: 24.5 parts of unchanged 1,3-dioxolane, 396.5 parts of unchanged ethylene glycol, 140.5 parts of di(beta hydroxyethyl) formal, and 72.4 parts of a colorless fairly viscous liquid polymer.

*Example 2.*—A mixture comprising 1110 parts of 1,3-dioxolane, 930 parts of ethylene glycol and 10 parts of sulfuric acid was processed under conditions simulating those of Example 1 with the exception that calcium carbonate was used to neutralize the catalyst. 567 parts of glycol and di(beta hydroxyethyl) formal was distilled off at 2 mm. leaving 1325 parts of polymer. This polymer gave on analysis the following data: hydroxyl No. 591; refractive index at 25° C., 1.4510; and density at 25° C., 1.1665.

The following examples illustrate the preparation of higher molecular weight polymers. Reaction conditions were the same as described above. The sulfuric acid catalyst was converted to ammonium sulfate by the addition of anhydrous ammonia and aqueous caustic was then added to give from 1 to 10% excess. In order to obtain the high molecular weight polymers, it is advisable to add the anhydrous ammonia before the aqueous base in order to eliminate the possibility of water combining with the polymer. The molecular weights were determined by the solution method.

*Example 3.*—Reaction mixture:

740 parts 1,3-dioxolane
62 parts glycol
3.5 parts $H_2SO_4$

Product:

82 parts unchanged 1,3-dioxolane
648 parts polymer. Viscous colorless, liquid. Molecular weight, 440.

*Example 4.*—Reaction mixture:

740 parts 1,3-dioxolane
15.5 parts glycol
3.5 parts $H_2SO_4$

Product:

102.5 parts unchanged 1,3-dioxolane
620 parts polymer, a solid melting at 44–50° C. Molecular weight, 710.

*Example 5.*—Reaction mixture:

740 parts 1,3-dioxolane
7.8 parts glycol
3.5 parts $H_2SO_4$

Product:

88 parts 1,3-dioxolane
649 parts polymer. Colorless solid melting at 49–54° C. Molecular weight, 939.

*Example 6.*—Reaction mixture:

740 parts 1,3-dioxolane
1 part glycol
3.5 parts $H_2SO_4$

Product:

70 parts unchanged 1,3-dioxolane
660 parts polymer. Colorless solid melting at 52–54° C. Molecular weight, 1284.

All of the above described polymers are miscible in all proportions with benzene, methanol, and water. They also dissolve nitrocellulose.

*Example 7.*—A reaction mixture prepared from 90 parts of anhydrous glucose, 740 parts of 1,3-dioxolane, and 4 parts of $H_2SO_4$ was heated on a steam bath with stirring for 5 hours. Boiling ceased at the end of 0.5 hour. Glucose dissolved yielding a homogeneous reaction mixture after processing 3 hours. Sulfuric acid was neutralized to blue litmus with anhydrous $NH_3$ followed by 3.3 parts of $N_aOH$ in 12 parts $H_2O$. At 2 mm. and 100° C. unchanged 1,3-dioxolane, 158 parts, was stripped off. A benzene solution of the product was filtered to remove $N_aSO_4$. Removal of benzene at 3 mm. and 100° C. gave 677 g. of glucose-1,3-dioxolane polymer, a viscous liquid miscible with water, benzene and methanol having a molecular weight of 650.

*Example 8.*—From equal parts by weight of 1,3-dioxolane and glucose and duplicating the conditions of Example 7, an extremely viscous liquid was obtained which was miscible with water, benzene and methanol and had a molecular weight of 1060.

*Example 9.*—A mixture consisting of 9.2 parts of glycerol, 592 parts of 1,3-dioxolane, and 3.4 parts of sulfuric acid was warmed until a homogeneous solution was obtained and then heated for 5 hours on a water bath. The catalyst was neutralized with anhydrous ammonia to blue litmus followed by 3.1 parts of $N_aOH$ in 10 parts of $H_2O$. Unconverted 1,3-dioxolane, 151 parts, was removed under reduced pressure. A benzene solution of the residue was treated with $CO_2$ and filtered. Benzene diluent was removed at 2 mm. and 100° C. 444.5 parts of glycerol-1,3-dioxolane polymer, a practically colorless solid, M. P. 43–49° C. soluble in water, benzene and methanol having a molecular weight of 694 was obtained.

*Example 10.*—To 740 parts of 1,3-dioxolane containing 3.5 parts of $H_2SO_4$ was added 45.5 parts of sorbitol. The mixture was warmed a few minutes with agitation to effect solution of the sorbitol and then heated under a return condenser on the steam bath for 5 hours. Boiling ceased after 0.5 hour with the production of a viscous liquid. Subsequent to neutralization of the catalyst with anhydrous NH₃ to blue litmus followed by 3.1 parts of NaOH in 12 parts of water, unconverted 1,3-dioxolane, 172 parts, was removed under reduced pressure at about 100° C. The resulting polymer was dissolved in benzene, the solution filtered to remove Na₂SO₄ and the benzene removed under reduced pressure, finally to 1 mm. and 100° C. The remaining viscous polymer, 615 parts, solidified on standing—hydroxyl No. 172.3; molecular weight in boiling benzene, 720.

The examples which follow were carried out under conditions simulating to those used in Example 10.

*Example 11.*—Reaction mixture:

50.5 parts 1-thiosorbitol
740 parts 1,3-dioxolane
4 parts H₂SO₄

Product:

157 parts unconverted dioxolane
612 parts 1-thiosorbitol-dioxolane polymer. Semi-solid. Hydroxyl No. 210. Molecular weight in boiling benzene, 525. Soluble in water and benzene.

*Example 12.*—Reaction mixture:

210 parts polyvinyl alcohol
370 parts 1,3-dioxolane
3 parts H₂SO₄
257.5 parts unconverted 1,3-dioxolane
289 parts very light colored tough solid polyvinyl alcohol-dioxolane polymer which was insoluble in water.

*Example 13.*—Reaction mixture:

84.5 parts ethylene glycol
481 parts 4-methyl-1,3-dioxolane
2.8 parts H₂SO₄

Product:

53.3 parts ethylene and propylene glycols
107 parts 1,3-dioxolane
179 parts 4-methyl-1,3-dioxolane
127.8 parts viscous liquid polymer.

*Example 14.*—Reaction mixture:

248 parts ethyleneglycol
352 parts 2-methyl-1,3-dioxolane
6 parts H₂SO₄

Product:

271 parts 2-methyl-1,3-dioxolane
219.5 parts glycol
46 parts di-(beta-hydroxy-ethyl) acetaldehyde acetal (HOCH₂CH₂O)₂CHCH₃, B. P. 110° C./3 mm.; density at 25° C., 1.1185; refractive index at 25° C., 1.4455. Small quantity of higher polymers.

*Example 15.*—Reaction mixture:

220 parts polyethylene glycol (molecular weight in boiling benzene, 360)
740 parts 1,3-dioxolane
4 parts H₂SO₄

Product:

232 parts 1,3-dioxolane
724 parts polyethylene glycol-dioxolane polymer. Soluble in water and benzene. Hydroxyl No. 84. Molecular weight in boiling benzene, 930.

*Example 16.*—Reaction mixture:

15 parts hexamethylene glycol
740 parts 1,3-dioxolane
3.5 parts H₂SO₄

Product:

50 parts 1,3-dioxolane
694 parts hexamethylene glycol-dioxane polymer. Hydroxyl No. 163; refractive index at 25° C. 1.4575; density at 25° C., 1.170; molecular weight in boiling benzene, 694.

*Example 17.*—Reaction mixture:

13.6 parts pentaerythritol
592 parts 1,3-dioxolane
3 parts H₂SO₄

Product:

162 parts 1,3-dioxolane
443 parts pentaerythritol-1,3-dioxolane polymer, viscous liquid which solidified on standing. Soluble in water and benzene. Hydroxyl No. 79.4; molecular weight in boiling benzene, 1150.

*Example 18.*—Reaction mixture:

135 parts 1,3-butylene glycol
740 parts 1,3-dioxolane
3.5 parts H₂SO₄

Product:

135.7 parts 1,3-dioxolane
152 parts 4-methyl-1,3-dioxane
575.5 parts somewhat viscous polymer. Soluble in benzene and water. Hydroxyl No. 278. Molecular weight in boiling benzene, 430.

*Example 19.*—Reaction mixture:

228 parts methoxy ethanol
740 parts 1,3-dioxolane
4 parts H₂SO₄

Product:

247 parts 1,3-dioxolane
701 parts somewhat viscous methoxy ethanol-1,3-dioxolane polymer. Soluble in water and benzene. Hydroxyl No. 207; refractive index at 25° C., 1.4435; molecular weight in boiling benzene, 310.

*Example 20.*—A mixture comprising 30 parts of β-hydroxy-ethyl hydroxy acetate, 740 parts of 1,3-dioxolane and 3.5 parts of sulfuric acid was heated in a water bath for 5 hours. Subsequent to neutralization to litmus of the catalyst with anhydrous NH₃ followed by 3.1 parts of NaOH in 12 parts of water, unconverted 1,3-dioxolane, 165 parts, was removed at 1 mm. pressure and 100° C., and 604 parts of β-hydroxyethyl hydroxy acetate glycol polyformal was obtained. It was a colorless viscous liquid soluble in water, benzene and methanol. Molecular weight 721.

The compounds prepared in accord with the invention may be employed for a large number of uses. The polymers which are soluble in water are suitable as additions to various baths for the treatment of natural and synthetic textiles. For example, they may be employed in washing, dyeing, after-treating, mercerizing, carbonizing, fulling, wetting, dispersing, emulsifying, and levelling operations, and furthermore, for improving the fastness of dyeings to rubbing. These polymers may likewise be used as solvents and as assistants for converting dyestuffs into pastes and as emulsifying agents, for instance, for dispersing oils, fats, and hydrocarbons.

The polymers are well adapted for use as a size, size lubricant, and warp size plasticizer; they are likewise suitable for use as spinning bath assistants, twist setter, yarn conditioner, and may be used in the printing of textiles to improve fabric receptivity by treatment of the yarns or cloth either prior to or subsequent to dyeing, and as a spreading and dispersing agent for printing pastes and dyes; they likewise are suitable for use in making fabrics impervious to oils; as a substitute oil size for synthetic and natural fibers; as an ingredient in mercerizing liquors; as a softener and "hand" improver for cotton, rayon, silk, wool, and nylon; as a degumming agent for silk and wool; as a coating for the protection of yarns during processing; as a delustering agent for rayon and silk; as a crease and crinkle-proofing agent and for use in the fulling and finishing of textiles.

In the leather, rubber, and synthetic plastics field the polymers of this invention may be used as plasticizers particularly for incorporation with the more flexible polymers, in rubber protective coatings, in cellulose derivatives such as cellulose acetate, cellulose nitrate, cellulose acetonitrate, and cellulose acetobutyrate, and in polyvinyl acetate and polyvinyl alcohol derivatives; they may likewise be used as a preservative for rubber and for preventing coagulation of latex emulsions. They are adaptable for use as mold lubricants; dispersing agents for rubber latex; as leather processing and finishing agents; for use in fur mordanting; as an ingredient in non-curling cellulose films and for rendering cellulose films, such as cellulose acetate and cellulose nitrate, non-corrosive; as wetting agents for use in processing natural and artificial leather; as a sealing agent for "cellophane" films; and as an ingredient of adhesives with glue, for example, for use in the leather, rubber and plastic arts generally.

The products dissolved or dispersed in water or other liquid or as prepared may likewise be used in the paper industry for increasing the wet strength of paper and cardboard; for greaseproofing paper and cardboard; as a paper size and softener; as a dispersing agent for pigments in paper coating; as a transparentizing agent for paper stock; as a carbon paper vehicle; and as a water soluble base for release of decalcomanias.

In the cosmetic field these polymeric compounds likewise find utility as an emulsifying agent for lotions and creams, and for rendering these materials antiseptic; they may be employed as a base for hair dressings and pomades; as an ingredient in permanent waving and hair conditioning treatment; as a component of paste soaps to prevent the tendency to set or gel; as an ointment base, primarily because of their ability to give good contact and the ease with which they are removed; and as an ingredient in hand, abrasive, and antiseptic soaps.

The polymers may be used to replace vehicles used in inks; as ink reducers; as solvents for the solids used; and to prevent mold formation in ink, hectograph, and ditto pads. In the paint industry they may be used to control tack and viscosity and for dispersing, spreading, emulsifying and wetting printing pigments and pastes; as an ingredient in non-drying and slow drying oil pastes; as a substitute for the alkyd resins; as an anti-livering and anti-skinning agent; and they may be employed to retard the drying of paint removers and paint solvents. They likewise may be used as high-boiling lacquer solvents to replace ether-alcohols in stains; as solvents for textile dye pastes, furniture polish; and the like; as a frosting inhibitor in China-wood oil; general thickener and toner; and as a solvent and softener for waxes, gums, rosin, and resins to be incorporated in paints, ink, varnish, lacquers, and the like.

The derivatives may likewise be used as a humectant in tobacco, fruits, and foods; as an air conditioning ingredient to lay dust; as a selective solvent for use in oil and gas purification, particularly in the petroleum industry; as a selective absorbent of gases; as a poison gas absorbent; and for extracting albumin from dried milk. The polymers may likewise be employed as a dehydrating agent for alcohols; as a liquid seal in gas holders; as an anti-freeze in gas meters, mains, refrigerators, and so forth; and as a conditioning agent for plant leaves to impart gloss and fresh appearance. They may likewise be used as gasoline stabilizers especially for tetraethyl lead to improve cetane number of fuels; as an ignition promoter in Diesel fuels and as a carbon and gum remover in internal combustion engines. They have found utility as a fungicide in the prevention of mildew, rot, mold and fungi prevention generally and as an ingredient in insect repellents and sprays. In the electroplating industry they may be employed as a substitute for glycerine foots and in metal industries generally as a metal cleaning ingredient. The polymers may likewise be employed as an ingredient in artificial flavors, non-spattering agent in cooking fats; anti-foaming agents; grinding aid in clinker cement; resin plasticizer for electrical insulation; ingredient in drilling fluids to control thixotropy; and as a flotation agent in ore treating.

We claim:

1. A process for the preparation of solid polymers from glycols and 1,3-dioxolane containing at least two groups having the structure —CH$_2$OCH$_2$CH$_2$O— which comprises reacting in solution under substantially anhydrous conditions from about 48 to 740 parts by weight of 1,3-dioxolane per part by weight of a glycol containing up to and including 8 carbon atoms in the presence of at least 0.001% by weight of an acidic catalyst, after the solid polymer has been formed neutralizing the catalyst and thereafter recovering the polymeric products.

2. A process for the preparation of a solid ethylene glycol-1,3-dioxolane polymer which comprises heating in solution from 48 to 740 parts by weight of 1,3-dioxolane per part by weight of ethylene glycol with at least 0.001% by weight of an acidic catalyst under substantially anhydrous conditions and subsequently thereafter neutralizing the catalyst and separating from the reaction product the ethylene glycol-1,3-dioxolane polymer.

3. A process for the preparation of a solid ethylene glycol-1,3-dioxolane polymer which comprises heating in solution 740 parts by weight of 1,3-dioxolane with 7.8 parts by weight of ethylene glycol while in contact with 3.5 parts by weight of sulfuric acid as the catalyst, neutralizing the catalyst with sodium methoxide to blue litmus and subsequently separating from the resulting product the solid ethylene glycol-1,3-dioxolane solid polymer having a molecular weight of about 939.

4. A process for the preparation of a solid hexamethylene glycol-1,3-dioxolane polymer which comprises heating in solution 740 parts by weight of 1,3-dioxolane with 15 parts by weight of hexamethylene glycol while in contact with 3.5 parts by weight of sulfuric acid as the catalyst, neutralizing the catalyst and subsequently separating from the resulting product the solid hexamethylene glycol-1,3-dioxolane having a molecular weight of 694.

5. A solid glycol-1,3-dioxolane polymer produced in accord with the process of claim 1.

6. A solid glycol-1,3-dioxolane polymer produced in accord with the process of claim 2.

7. A solid hexamethylene glycol-1,3-dioxolane polymer produced in accord with the process of claim 1.

DONALD J. LODER.
WILLIAM F. GRESHAM.

REFERENCES CITED

The following references are of record in the file of this patent:

UNITED STATES PATENTS

| Number | Name | Date |
|---|---|---|
| 996,191 | Ach | June 27, 1911 |
| 2,187,081 | Hodgins | Jan. 16, 1940 |
| 2,340,907 | Sussman | Feb. 8, 1944 |
| 2,360,477 | Dahle | Oct. 17, 1944 |
| 2,366,737 | Loder et al. | Jan. 9, 1945 |
| 2,366,738 | Loder et al. | Jan. 9, 1945 |